United States Patent [19]

Trainor

[11] Patent Number: 5,029,054

[45] Date of Patent: Jul. 2, 1991

[54] LIGHT BASE AND TRANSFORMER HOUSING

[75] Inventor: Willis H. Trainor, Newark, Ohio

[73] Assignee: ADB-Alnaco, Inc., Columbus, Ohio

[21] Appl. No.: 472,457

[22] Filed: Jan. 30, 1990

Related U.S. Application Data

[63] Continuation-in-part of Ser. No. 269,932, Nov. 10, 1988, abandoned.

[51] Int. Cl.[5] .............. G01F 9/00

[52] U.S. Cl. .............. 362/153.1; 362/431; 52/296; 248/156

[58] Field of Search .............. 362/145, 153, 153.1, 362/368, 431; 336/651, 90; 52/296, 297, 169.1, 166; 248/156

[56] References Cited

U.S. PATENT DOCUMENTS

| | | | |
|---|---|---|---|
| 1,116,208 | 11/1914 | Barber | 52/296 |
| 3,042,161 | 7/1962 | Meyer, Jr. | 52/166 |
| 3,361,867 | 1/1968 | Ridder et al. | 336/90 |
| 3,861,995 | 1/1975 | Kellogg, Jr. | 336/90 |
| 3,988,870 | 11/1976 | Snavely | 52/296 |
| 4,343,033 | 8/1982 | Suzuki | 362/153 |
| 4,507,715 | 3/1985 | Wedding | 362/153 |
| 4,617,768 | 10/1986 | Gebelius | 362/431 |
| 4,716,508 | 12/1987 | Kramer et al. | 312/431 |
| 4,744,014 | 5/1988 | Harris | 362/153 |

FOREIGN PATENT DOCUMENTS

| | | | |
|---|---|---|---|
| 924930 | 5/1963 | United Kingdom | 362/431 |

*Primary Examiner*—Stephen F. Husar
*Assistant Examiner*—D. M. Cox
*Attorney, Agent, or Firm*—John L. Gray

[57] ABSTRACT

A light base and transformer housing to house an isolation transformer and to be used as a mounting base for airport mavigational lights comprising a unitary housing made from a noncorrosive material provided with external vertically extending fluted indentations so that said housing will have greater compressive strength and will resist movement in the ground when installed therein and after concrete or bitumen has been poured around said housing.

3 Claims, 1 Drawing Sheet

LIGHT BASE AND TRANSFORMER HOUSING

This application is a continuation-in-part of application Ser. No. 269,932, filed 11/10/88 now abandoned.

BACKGROUND OF THE INVENTION

Existing light base and transformer housings are used to house isolation transformers and provide a mounting base for elevated navigational lights which are located along the edge of airport taxiways. Such light bases are non-loading bearing as to aircraft and are in the form of cylindrical housings. The bottom end of the cylindrical housing is closed and the cylinder wall adjacent thereto is provided with openings for electrical conduit. The open end of the housing is provided with a flange which is open in its center to allow access to the inside of the cylindrical enclosure as well as to provide a mounting surface for a base plate that receives and supports an elevated navigational light or a cover lid which seals the light base and transformer housing. The combination light base and transformer housing is installed by placing the closed end down on compacted earth. A circular protective cover may be placed over the housing. Concrete or a bituminous material is then poured around the light base and transformer housing as a part of the taxiway construction. The existing light base and transformer housing are made from a metal fabricated cylinder which entails welding several metal components together and then drilling and tapping the numerous equally-spaced holes in the flange located on the open end of the cylinder. After fabrication the housing is covered with a protective metallic coating to prevent the metal housing material from corroding in the ground.

As a result of time and exposure to moisture, caustic solutions, surrounding soil or pavement acidity, and improper handling during installation, the protective coating becomes chipped and broken and begins to deteriorate and exposes the metal substrate which begins to oxidize and corrode and deteriorates to such an extent that the housing must be removed and replaced. Caustic and corrosive chemicals are also found in herbicides and deicing fluids which are used respectively to control vegetation or for snow and ice removal of aircraft and accumulate around the light base installation. Since the light base and transformer housing have been fabricated from metal, they are heavy and require large amounts of physical energy to be expended to handle and install them in the ground.

SUMMARY OF THE INVENTION

The invention of applicant provides a light base and transformer housing which is light in weight, which may be molded in one unitary piece, and is provided with vertically extended fluted indentations on the exterior thereof to prevent the housing from moving once it has been implanted in the ground, either in concrete or bitumen. The vertically extended fluted indentations not only prevent the housing from rotating in the ground but also have the additional advantage of increasing the load-bearing characteristics of the housing and also provides resistance to axial forces and thus may be made even more light weight than if not constructed in this fashion. The housing of the instant invention is easy to manufacture and may be readily handled during the installation procedure and once in place, will not be disturbed as a result of shifts in the pavement from the weight of heavy aircraft or other vehicles thereon.

It is therefore an object of this invention to provide a light base and transformer housing which is light weight.

It is still another object of this invention to provide a light base and transformer housing which may be easily installed in the ground.

It is still another object of this invention to provide a light base and transformer housing which will resist corrosion in the ground.

It is a further object of this invention to provide a light base and transformer housing which will resist movement once installed in the ground and can be made extremely light weight because of its construction to resist axial loads.

These, together with other objectives and advantages of the invention should become more readily apparent from the details of construction and operation, as more fully described herein and claimed, reference being had to accompanying drawings forming a part hereof wherein like numerals refer to like parts throughout.

DETAILED DESCRIPTION OF THE INVENTION

Figure 1:
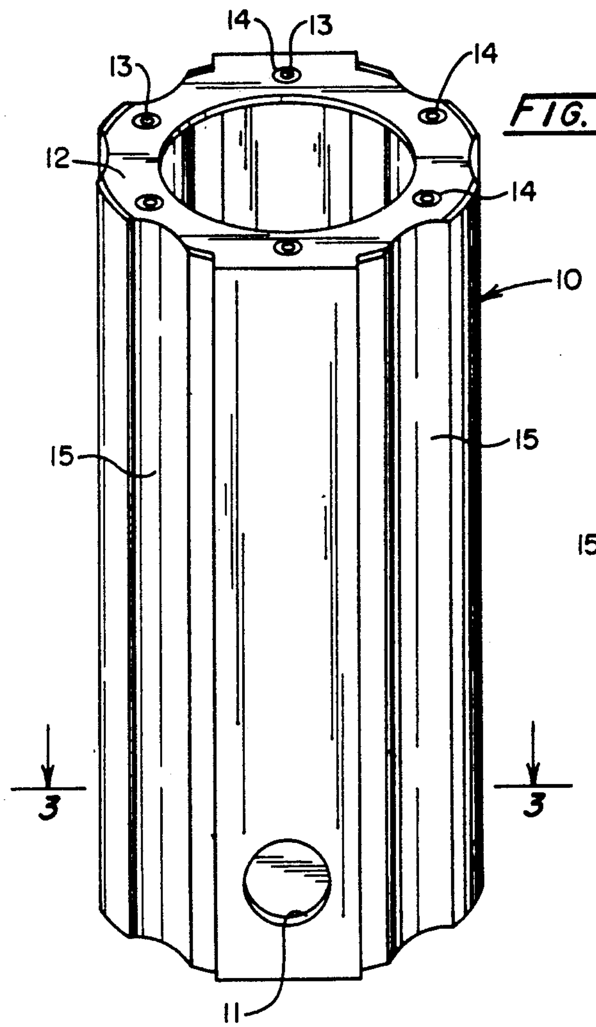
FIG. 1 is a perspective view of the light base and transformer housing of the instant invention.
Figure 2:
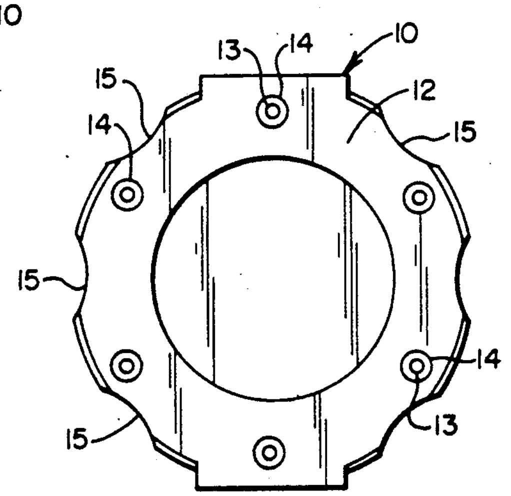
FIG. 2 is a plan view of the light base and transformer housing shown in FIG. 1.
Figure 3:
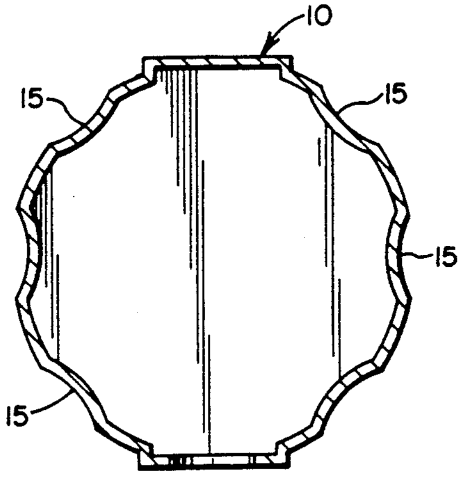
FIG. 3 is a section through the light base and transformer housing on section 3—3 of FIG. 1.

Referring now more particularly to FIG. 1, the light base and transformer nousing is shown generally at 10 and is provided with a plurality of conduit openings 11—11 in the base thereof The upper portion of the housing 10 is provided with a flange 12 to be used as a mounting base for elevated navigational lights or a cover lid. The flange 12 contains equi-spaced holes 13—13 fitted with stainless steel inserts 14—14 adapted to receive appropriate fastening devices.

The housing 10 is provided with a series of vertically extending fluted indentations 15—15 which increase the load bearing characteristics of the device and help it resist axial forces and also upon installation in the ground prevent movement of the light base and transformer housing.

While various materials can be used to construct the housing 10 of the present invention, a high-impact resistant plastic resin is preferred which will not corrode when exposed to moisture and air, and will resist caustic and corrosive chemicals.

While this invention has been described in its preferred embodiment, it is to be appreciated that slight variations therefrom may be made without departing from the true scope and spirit of the invention.

What is claimed is:

1. A light base and transformer housing comprising a cylindrical housing closed at one end and open at the opposite end and adapted to be installed under pavement in an airport runway or taxiway, said cylindrical housing being provided with a plurality of openings adjacent said closed end adapted to receive electrical conduit, said open end being provided with a flange extending around said open end and extending inwardly from the exterior of said cylindrical housing, said flange being so positioned on said housing that the top of said flange will be level with the said pavement when installed therein, the exterior of said cylindrical housing being provided with a plurality of vertically extending fluted indentations of a depth so that said housing will resist movement in the ground when installed therein and after concrete or bitumen has been poured around said cylindrical housing.

2. The light base and transformer housing of claim 1 wherein said housing is molded from a plastic material.

3. The light base and transformer housing of claim 1 wherein said flange is provided with a plurality of vertically extending openings therein adapted to receive fastening means.

* * * * *